United States Patent
Holzinger

(10) Patent No.: US 10,047,227 B2
(45) Date of Patent: Aug. 14, 2018

(54) UV-CURABLE COATING COMPOSITION HAVING IMPROVED SUNLIGHT STABILITY

(71) Applicant: TIGER COATINGS GMBH & CO. KG, Wels (AT)

(72) Inventor: Dieter Holzinger, Wels (AT)

(73) Assignee: TIGER COATINGS GMBH & CO. KG, Wels (AT)

( * ) Notice: Subject to any disclaimer, the term of this patent is extended or adjusted under 35 U.S.C. 154(b) by 0 days.

(21) Appl. No.: 15/500,224

(22) PCT Filed: Jul. 24, 2015

(86) PCT No.: PCT/EP2015/066971
§ 371 (c)(1),
(2) Date: Jan. 30, 2017

(87) PCT Pub. No.: WO2016/016112
PCT Pub. Date: Feb. 4, 2016

(65) Prior Publication Data
US 2017/0260399 A1 Sep. 14, 2017

(30) Foreign Application Priority Data
Jul. 30, 2014 (EP) ..................... 14179171

(51) Int. Cl.
| | | |
|---|---|---|
| *C08F 2/50* | (2006.01) | |
| *C08F 2/46* | (2006.01) | |
| *C08G 61/04* | (2006.01) | |
| *C09D 4/00* | (2006.01) | |
| *C08F 222/10* | (2006.01) | |
| *C09D 11/101* | (2014.01) | |
| *C09D 11/30* | (2014.01) | |
| *C09D 7/48* | (2018.01) | |

(52) U.S. Cl.
CPC .......... *C09D 4/00* (2013.01); *C08F 222/1006* (2013.01); *C09D 7/48* (2018.01); *C09D 11/101* (2013.01); *C09D 11/30* (2013.01)

(58) Field of Classification Search
CPC ...... C09D 4/00; C09D 11/101; C09D 7/1241; C09D 11/30; C08F 222/1006
USPC .................. 522/182, 178, 1; 520/1
See application file for complete search history.

(56) References Cited

U.S. PATENT DOCUMENTS

| | | | |
|---|---|---|---|
| 2011/0045199 A1* | 2/2011 | Cong ...................... | C08F 2/48 427/487 |
| 2011/0183081 A1* | 7/2011 | Nakane ................ | B41M 5/0023 427/511 |
| 2012/0189822 A1* | 7/2012 | Ito ........................ | C09D 11/101 428/195.1 |
| 2012/0288718 A1* | 11/2012 | Takano ................ | C09D 7/1241 428/423.1 |

OTHER PUBLICATIONS

Eiichiro Takiyama, "Polyester Jushi Handbook", The Nikkan Kyogyo Shimbun, Ltd., 1988.
International Search Report for PCT/EP2015/066971, dated Sep. 2, 2015.
Radotech Kenkyukai, "UV-EB Koka Gijutsu (Genryo Hen)", CMC, 1989, pp. 79.
Sinzo Yamashita, "Kakyozai Handbook", Taiseisha Ltd., 1981.

* cited by examiner

*Primary Examiner* — Jessica Whiteley
(74) *Attorney, Agent, or Firm* — Norton Rose Fulbright US LLP

(57) ABSTRACT

Disclosed is a radiation curable coating composition, including polymerizable, unsaturated compounds such as (meth)acrylates, vinyl compounds, or the like in a concentration range of 15-98% by weight, with an addition of 5-35% by weight, preferably 5-20% by weight, of organic UV absorber(s), wherein the UV absorber(s) has/have its/their maximum absorption coefficient in a wavelength range of <390 nm, preferably <350 nm, wherein the coating composition optionally includes other components in the amount of the balance to 100% by weight, and a method for curing such a coating composition. Also disclosed is a coating composition of this kind, wherein the organic UV absorber is radically polymerizable.

17 Claims, 4 Drawing Sheets

Figure 1:
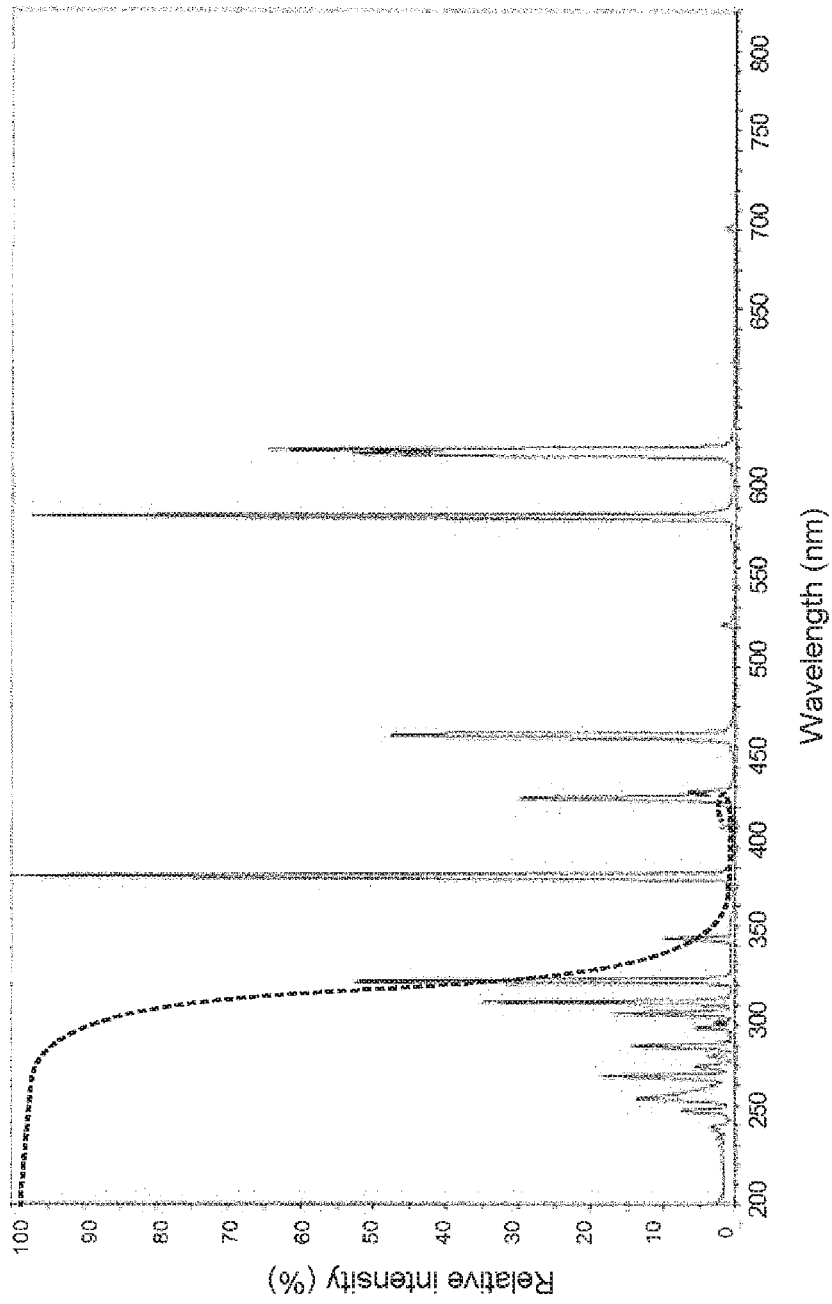

Figure 1: Emission spectrum of a mercury-based UV lamp; the dashed line shows the absorption curve of a typical UV absorber Figure 2: Comparison of the emission spectra of a mercury UV lamp, a UV-LED with the absorption curve of a UV absorber (dashed line)

Figure 3:
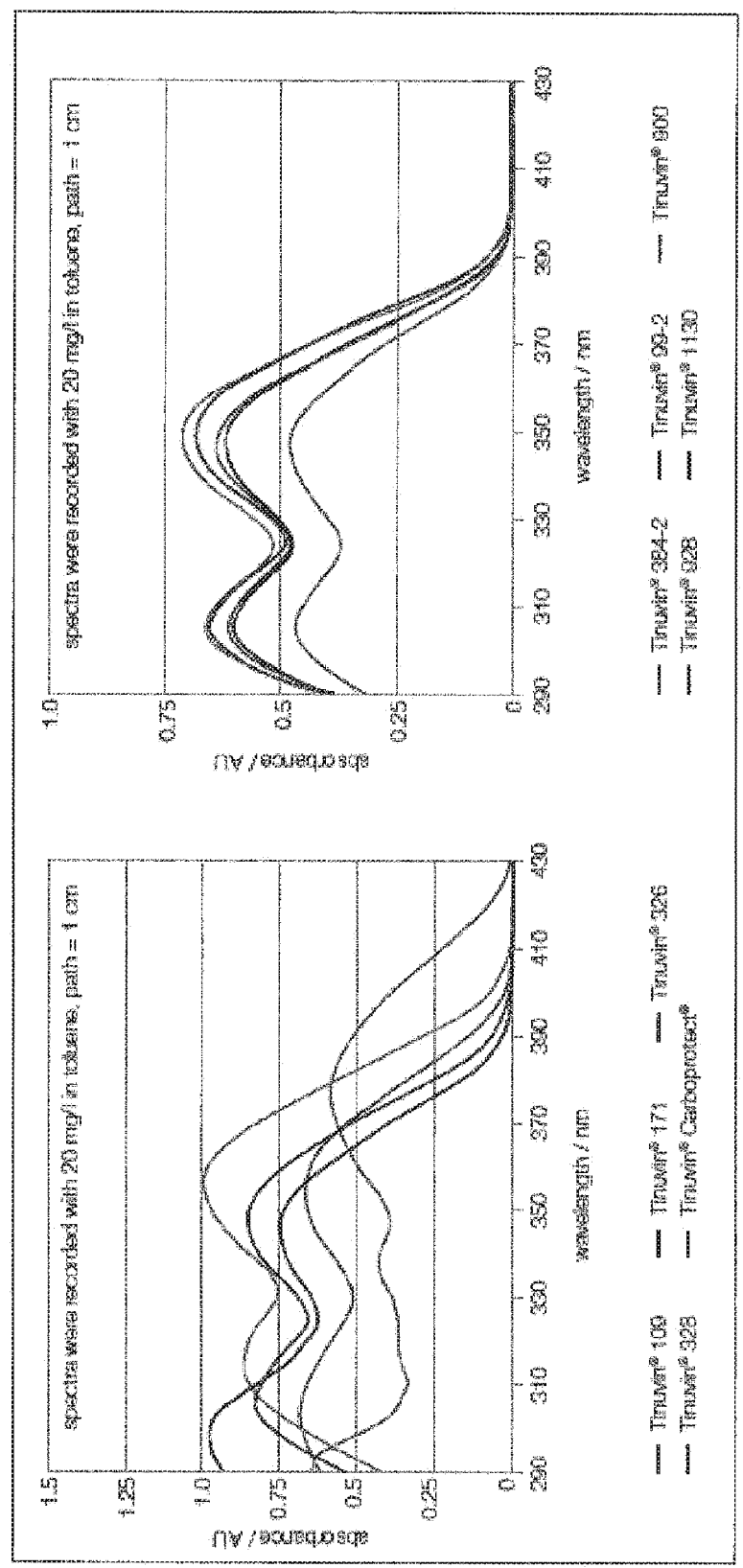

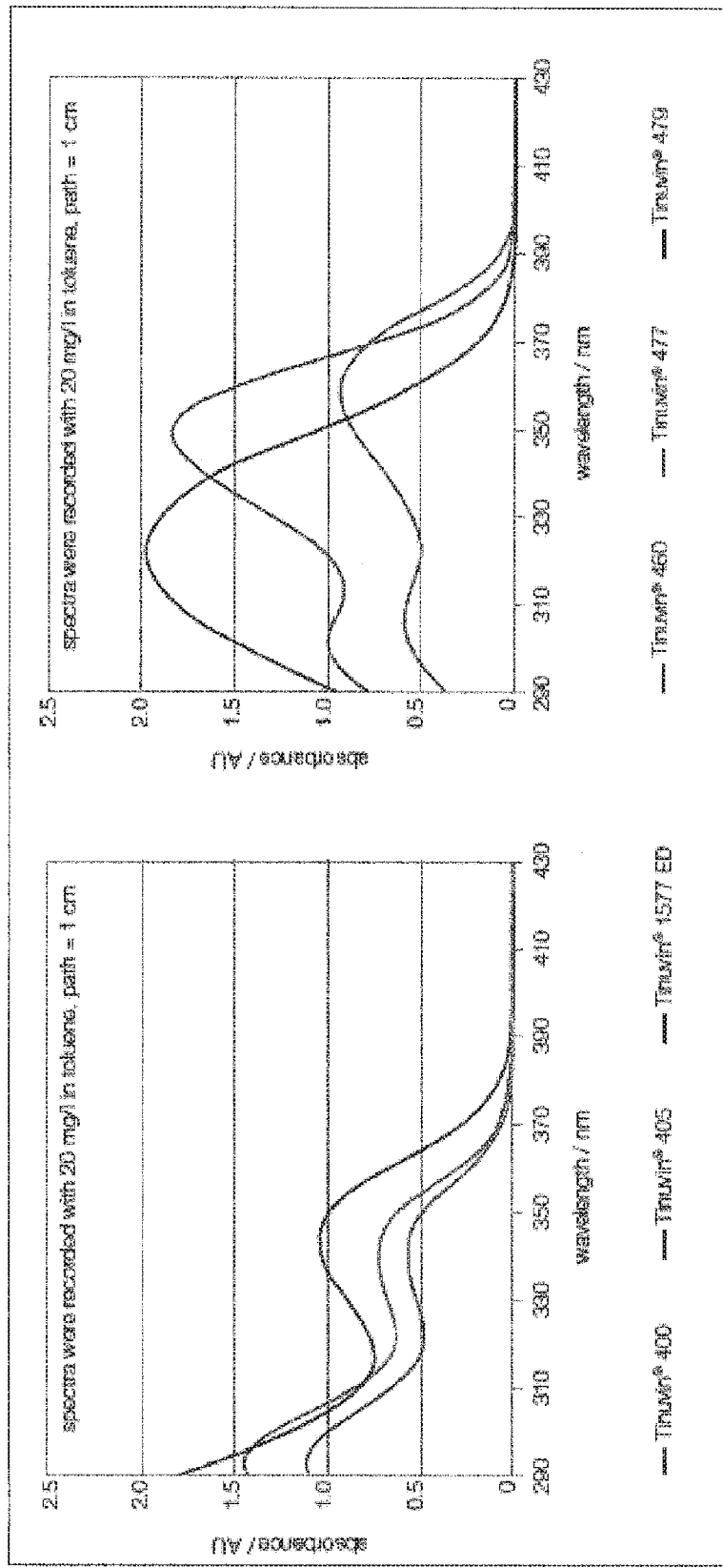
Continuation of Figure 3

UV-CURABLE COATING COMPOSITION HAVING IMPROVED SUNLIGHT STABILITY

CROSS-REFERENCE TO RELATED APPLICATIONS

This application is a national phase application under 35 U.S.C. § 371 of International Application No. PCT/EP2015/066971 filed 24 Jul. 2015, which claims priority to European Patent Application No. 14179171.5 filed 30 Jul. 2014. The entire contents of each of the above-referenced disclosures is specifically incorporated by reference herein without disclaimer.

Nowadays, a wide variety of coating systems are employed in the exterior and facade area. Many of these coating systems have in common the use of a wide variety of UV absorbers in order to reduce the degradation of the polymer matrix or of the employed organic pigments. If UV absorbers and radical scavengers are not employed, the incident UV radiation induces radical formation and oxidation, which leads to a degradation of the polymer chain and to a fading of the pigments used. However, these UV absorbers are considerably limiting the potential curing mechanisms and the handling of the coating systems or have a limiting effect on the coloring. Making use of UV absorbers is not possible in conventional UV curing systems since UV induced polymerization relies on a best possible and overall penetration of the layer to be cured. UV absorbers which are localized in the layer would absorb the UV radiation necessary for polymerization which results in insufficient curing.

UV-curable inkjet inks are currently used primarily for short-term outdoor applications (e.g. printing on truck tarpaulins) with a residence time of up to 3-5 years. A strategy to increase the lifetime of objects coated with UV curable inkjet inks is to employ protective finishes to protect the imprinted layer from damaging effects of UV radiation and moisture. However, this approach is disadvantageous in that an additional operational step is required for applying the protective overcoat layer.

Another option is to improve the weathering resistance of the UV stability of UV-curable inkjet inks, and the following possibilities have already been documented.

a) Use of inorganic pigments:

As explained in JP2005248065A, the nowadays conventional organic pigments can be replaced by inorganic pigments which have a significantly higher light resistance. A disadvantageous consequence of using inorganic pigments is a significant reduction of the imageable color range. Furthermore, inorganic pigments absorb clearly more UV radiation than organic pigments which causes problems of incomplete hardening especially in UV curing of bulkier print layers; this, in turn, shows negative effects on the weathering resistance of the imprinted layer.

b) Use of "living" polymerization mechanisms such as anionic or cationic polymerization:

As described in JP2008031316A, good results in curing through thick layers can be obtained by the use of living polymerization mechanisms despite the presence of UV absorbers. In using these polymerization types, a disadvantage arises from the aggressiveness of the catalysts to be used. These are made of super acids and cause corrosion of the inkjet print heads. Furthermore, inkjet inks, which are based on living polymerization mechanisms, show a strongly increased sensitivity to stray light resulting in an increased probability of a complete polymerization of the inks in the print heads.

c) Use of organic or inorganic UV absorbers:

As described in JP2003268026A, UV absorbers can be used in conventional UV curable inkjet inks in small quantities only, as UV polymerization and UV protection of the layer are competing with each other in some way. While UV absorber is required for a complete curing of the imprinted ink layer, in order to make sure the ink layer gets penetrated by UV radiation as completely as possible, the ink layer should, for a good UV protection, be penetrated by UV radiation as little as possible. Thus, the use of UV absorbers leads to problems concerning the curing of printed layers which may adversely affect the weathering stability of the layers. Furthermore, the UV absorbers will be consumed during the UV curing and, thus, there is no longer provided a long-term protection for outdoor use. The compromise disclosed in the examples of the invention is based on limiting the concentration of UV absorbers to a few % by mass.

d) Use of photoinitiators which absorb in the visible light:

The use of photoinitiators described in GB2348647A which absorb in the visible light, enables the use of UV absorbers in UV-curable inks as there is no overlapping of the UV absorption spectra of the UV absorbers and of the photoinitiators. However, the use of photoinitiators, which absorb in the visible light, shows a distinctly negative effect on the processability of the inks as these have therefore to be produced and processed without any irradiation of visible light.

In summary, the need exists for a coating (e.g. an ink) which on one hand is UV-curable and on the other has a higher outdoor stability (in particular to sunlight).

It is an object of the present invention to provide a radiation curable, specifically UV-curable coating composition (such as an ink, liquid paint and powder coat) having an improved outdoor resistance (UV light resistance) which does not have the aforementioned disadvantages. Surprisingly, it has been shown that radiation curable coating compositions, preferably inks, including polymerizable, unsaturated compounds such as (methyl)acrylates, vinyl compounds and the like in a concentration range of 15-98% by weight, with an addition of 5-35% by weight, preferably 5-20% by weight, of organic UV absorber(s), do not have the disadvantages mentioned above if the UV absorbers are characterized by having their maximum absorption coefficient in a wave length range of <390 nm, preferably <350 nm.

The radiation curable coating composition according to the invention, including polymerizable, unsaturated compounds such as (meth)acrylates, vinyl compounds, or the like in a concentration range of 15-98% by weight, with an addition of 5-35% by weight, preferably 5-20% by weight, of organic UV absorber(s), wherein the UV absorber(s) has/have its/their maximum absorption coefficient in a wavelength range of <390 nm, preferably <350 nm, and the coating composition optionally includes other components in an amount of the balance to 100% by weight, is, according to one embodiment of the present invention, characterized in that the organic UV absorber is radically polymerizable. As described below and indicated in the examples, such UV absorbers are, for example, offered by Otsuka Chemical Co., Ltd. under the product name RUVA-93.

The coating composition according to the invention may in both cases optionally contain further components such as photoinitiator(s) and/or photosensitizer(s), bulking agents, pigments, additives and other UV absorbers in a total concentration range of 0-80% by weight or these components optionally constitute the balance to 100% by weight.

Particularly preferred, the task of the invention of sufficiently curing the coating composition of the invention to obtain a curing having at the same time a good to very good UV light resistance can be solved by using conventional UV sources having an emission spectrum of >350 nm. This light source may for example be a UV/LED lamp or a HG/UV lamp with appropriate filters to be meeting the emission peak at >360 nm, preferably >390 nm.

The radiation curable coating composition according to the invention includes polymerizable, unsaturated compounds such as (meth)acrylates, vinyl compounds, or the like in a concentration range of 15-98% by weight. In addition, it includes 5-35% by weight, preferably 5-20% by weight, of an UV absorber, particularly preferred of an organic UV absorber, which absorber is characterized in that its maximum absorption coefficient is in a wave length range of <390, preferably <350 nm. Further, the radiation curable coating composition according to the invention optionally includes photosensitizers and/or photoinitiators which have their absorption maximum in a range of less than 420 nm and preferably greater than 350 nm.

Optionally, the inventive radiation curable coating compositions may include other components such as additional photoinitiator(s) and/or photosensitizer(s), bulking agents, pigments, additives and other UV absorbers in a total concentration range of 0-80% by weight.

Preferably, the proportion of the monofunctional polymerizable components in the inventive coating composition is at least 50% by weight, preferably at least 75% by weight, of all the polymerizable components. These coating compositions are characterized by a good balance between hardness and flexibility of the cured coating.

Other preferred embodiments of the coating compositions are characterized in that the proportion of the monofunctional polymerizable components is at most 25% by weight of all the polymerizable components. These embodiments are particularly suitable for hard coatings.

Other preferred embodiments of the coating compositions are characterized in that the proportion of the monofunctional polymerizable components is at least 75% by weight of all the polymerizable components. These embodiments are particularly suitable for flexible coatings.

The coating composition according to the invention may be in both, a liquid form or a solid powder form. Possible embodiments are for example liquid and powder coatings. In a preferred embodiment, this coating composition is carried out as an ink, in particular as an inkjet ink.

Below are shown some examples of possible components of the inventive coating composition.

The coating composition according to the invention may either be directly applied to the substrate to be coated or to one or more previously applied coatings of the substrate (called primers). These primers can for example improve the adhesion and corrosion protection. Following its application onto the substrate to be coated, the inventive coating composition may as well be coated with additional layers prior to and/or following its curing in order to improve its mechanical, optical or further properties. An increased light stability can be achieved by this, too.

Polymerizable, Unsaturated Compounds:

For the acrylic and methacrylic monomers and vinyl compounds, mono- to oligofunctional compounds are usable within the scope of the invention. The variety of available materials is very wide, and the listing below merely represents an excerpt of it.

Examples of monofunctional (meth)acrylic acid esters are: lauryl acrylate, isodecyl acrylate, tridecyl acrylate, tetrahydrofurfuryl acrylate (THFA), 2-(2-ethoxyethoxy) ethyl acrylate (EOEOEA), cyclic trimethylolpropane formal acrylate (CTFA), isobornyl acrylate (IBOA), C12-C14 alkyl methacrylate, tetrahydrofurfuryl methacrylate (THFMA), polypropylene glycol mono methacrylate and isobornyl methacrylate. The bifunctional (meth)acrylic acid esters are, for example, ethoxylated bisphenol A diacrylate, 1,6-hexanediol diacrylate (HDDA), polyethylene glycol 200 diacrylate (PEG200DA), polyethylene glycol 400 diacrylate (PEG400DA), polyethylene glycol 600 diacrylate (PEG600DA), tetraethylene glycol diacrylate (TTEGDA), triethylene glycol diacrylate (TEGDA), propoxylated neopentyl glycol diacrylate, esterdiol diacrylate, tripropylene glycol diacrylate (TPGDA, ethoxylated bisphenol A diacrylate, dipropylene glycol diacrylate (DPGDA), alkoxylated hexanediol, 1,6-hexanediol diacrylate, ethoxylated bisphenol A diacrylate, triethylene glycol dimethacrylate (TIEGDMA), ethylene glycol dimethacrylate (EGDMA), tetraethylene glycol dimethacrylate (TTEGDMA), 1,4-butanediol dimethacrylate (BDDMA), diethylene glycol dimethacrylate (DEGDMA), 1,6-hexanediol dimethacrylate (HDDMA), 1,3-butylene glycol dimethacrylate (BGDMA), ethoxylated bisphenol A dimethacrylate and tricyclodecane dimethanol dimethacrylate. Usable (meth)acrylic acid esters with a functionality of 3 or higher are for example ethoxylated trimethylolpropane triacrylate, pentaerythritol tetraacrylate (PETTA), trimethylolpropane triacrylate (TMPTA), ditrimethylolpropane tetraacrylate (DiTMPTTA), tris(2-hydroxyethyl) isocyanurate triacrylate, dipentaerythritol pentaacrylate (DiPEPA), dipentaerythritol hexaacrylate (Di PEHA), ethoxylated trimethylolpropane triacrylate, pentaerythritol triacrylate, ethoxylated trimethylolpropane triacrylate, propoxylated trimethylolpropane triacrylate, ethoxylated pentaerythritol tetraacrylate (PPTTA), ethoxylated trimethylolpropane triacrylate and trimethylolpropane trimethacrylate (TMPTMA). Examples of vinyl compounds are N-vinyl pyrrolidones, N-vinyl caprolactam, N-vinyl imidazoles, N-vinyl-N-methylacetamides, ethyl vinyl ether, n-butyl vinyl ether, iso-butyl vinyl ether, tert-butyl vinyl ether, cyclohexyl vinyl ether, 2-ethylhexyl vinyl ether, dodecyl vinyl ether, octadecyl vinyl ether, 1,4-butanediol divinyl ether, diethylene glycol divinyl ether, triethylene glycol divinyl ether, 1,4-cyclohexane dimethanol divinyl ether, hydroxybutyl vinyl ether, 1,4-cyclohexane dimethanol mono vinyl ether, 1,2,4-trivinyl cyclohexane, vinylphosphonic acid, and vinylphosphonic acid dimethyl ester.

Besides the monomers listed herein there are numerous others with a similar construction. They can be found in the product overviews of numerous manufacturers such as Sartomer, BASF or Rahn, which are well-known to one skilled in the art.

In addition, polymerizable oligomers can be used. These include, inter alia, epoxy acrylates, aliphatic and aromatic urethane acrylates, polyester acrylates, and acrylic oligomers.

In the selection of the monomers and oligomers and their quantity ratio in the formulation, the viscosity has to be taken into consideration especially in liquid systems. The viscosity of the inks according to the invention is at processing temperature—usually about 15 to 60° C.—preferably in a range of 2 to 20 mPa·s, particularly preferred in a range of 6 to 12 mPa·s. It is understood that components having a low functionality tend to result in a lower viscosity, and components having a high functionality tend to result in a higher viscosity of the ink.

Further examples of polymerizable or crosslinkable molecules, which are currently available in the market, can be found in "KAKYOZAI HANDBOOK", edited by Sinzo Yamashita (published by TAISEISHA LTD. in 1981); "UV-EB KOKA GIJUTSU (GENRYO HEN)", edited by RADOTECH KENKYUKAI, page 79 (published by CMC in 1989); "POLYESTER JUSHI HANDBOOK" by Eiichiro Takiyama (published by THE NIKKAN KYOGYO SHIMBUN, LTD. in 1988).

Furthermore, radically polymerizable compounds can be found in the following patents: JP 7159983, JP 731399, JP 8224982, JP 10863, JP 9134011. These components may also be employed in the coating composition of the invention.

Mixtures of mono-, di- and polyfunctional monomers are preferably used in order to optimize adhesion, the curing rate and the chemical and mechanical stability.

Particularly preferred, monomers are employed in the coating composition of the invention which do not have cojugated double bonds or aromatic structures.

Initiators:

In principle, all initiators can be used in the coating composition of the invention.

The initiators used according to the invention absorb externally supplied energy, decompose and generate a radical species in this way which initiates polymerization. Examples of radiation include gamma radiation, beta radiation, electron radiation, UV radiation, visible light and infrared radiation. As part of a photo-polymerization, basically any known photoinitiator can be used.

Examples of photoinitiators, which can be used in the coating composition of the invention, may preferably include (a) aromatic ketones, (b) acylphosphine compounds, (c) aromatic onium salts, (d) organic peroxides, (e) thio compounds, (f) hexaaryl biimidazole compounds, (g) ketoxime ester compounds, (h) borate compounds, (i) azinium compounds, (j) metallocene compounds, (k) active ester compounds, (l) halogen compounds, and (m) alkylamine compounds.

These initiators for radical polymerization can be used either alone or in combination of two or more compounds. In the coating composition of the invention, preferably two or more initiators are used to improve the effectiveness of the polymerization.

Among others, particularly preferred photoinitiators are those of the classes of acylphosphine oxides and acylphosphonates, and useful representatives are for example bis(2,4,6-trimethylbenzoyl) phenylphosphine oxide, bis(2,6-dimethoxybenzoyl)-2,4,4-trimethyl pentyl phosphine oxide, and further 1-hydroxy cyclohexyl phenyl ketone, 2-methyl-1-[4-(methylthio) phenyl]-2-morpholinopropen-1-one and 2-hydroxy-2-methyl-1-phenylpropan-1-one. These compounds are for example available under the trade name Speedcure (Lambson), Irgacure®, Lucerin® (BASF) or Genocure (RAHN). The preferred addition amounts are in the range of 1 to 13, particularly preferred in the range of 2 to 10% by weight, based on the total weight of the formulation. The choice of photoinitiator is highly dependent on the type and amount of pigment used, and it is of advantage if pigment(s) and photoinitiator(s) do not absorb at the same wavelengths.

In addition, synergists can be used to further improve the effectiveness of the polymerization. Co-initiators or thiol and amine synergists can be used in the coating composition of the invention in order to improve the curing rate. Examples include isopropylthioxanthone, ethyl-4-(dimethylamino) benzoate and dimethylaminoethyl methacrylate.

An overview of conventional synergists is given, for example, in Journal of Polymer Society by M. R, Sander et al., vol. 10, p. 3173, (1972), and in JP 4420189, JP 5182102, JP 52134692, JP 59138205, JP 6084305, JP 6218537 and JP 6433104. Specific examples are given for the substance classes of triethanolamines, ethyl-p-dimethylamino benzoates, p-formyldimethyl anilines and p-methylthiodimethyl anilines.

Photoinitiators of the classes of thioxanthones and phosphine oxides are particularly preferred.

UV Absorbers:

UVA absorbers are used typically to improve the weatherability whereby three classes are usually distinguished, namely 2-hydroxyphenyl benzophenones (BP), 2-(2-hydrophenyl) benzotriazoles (BTZ) and 2-hydroxyphenyl-s-triazines (HPT). These classes, however, do not at all constitute a limitation whatsoever. All UV absorbers have in common that they are able to absorb UV-A ratiation and convert it into harmless heat. Known manufacturers are, for example, the companies of BASF and Lambson in Europe and Everlight Chemical in Asia. Suitable UV absorbers are, for example, available under the trade name Tinuvin® 109, 1130, 171, 326, 328, 384-2, 99-2, 900, 928, 1577ED, 400, 405, 460, 477, 479, Carboprotect® or Chimasorb® 81, 90 or Eversorb® 71, 72, 73, 74, 75, 76, 77, 78, 79, 80, 81, 82, 234, 109, 89 or Speedblock® 326, 328, 622, 770, 783, 791, 944, UV-0, UV-3, UV-6, UV-9, UV-92.

Besides UV absorbers which are taken up unbound into the formulation, it is also possible with regard to the coating compositions of the invention to incorporate the radically polymerizable UV absorbers into the polymer chain.

Incorporating it into the polymer chain allows for significantly higher concentrations of UV absorber(s) in the formulation because an UV absorber like that is not in an inert state in the formulation but reacted into the chain and thus does not hinder further polymerization. This leads to the formation of an uninterrupted network structure and thus a markedly higher degree of conversion of the polymerization. Further, the lower residual monomer content manifests itself in a lower odor development.

Owing to its incorporation into the polymer chain, the UV absorber is fixed significantly better in the hardened layer and cannot be washed out. This improves the performance of the overall system with respect to weatherability compared to the use of conventional UV absorbers.

Such UV absorbers are, for example, offered by Otsuka Chemical Co., Ltd., with the product RUVA-93. Another provider of such polymerizable UV absorbers is, for example, the company Polyscience, which distributes the product o-methylallyl Tinuvin P (oMTP) commercially. Apart from that, all UV absorbers can, in principle, be used as long as they have the specifications of maximum absorbance in a wavelength range of <390nm, preferably <350 nm, and of being radically polymerizable together with the monomers and/or oligomers employed in this invention in order to be incorporated into the formed polymer chain. Further examples of radically polymerizable UV absorbers are in particular the following compounds known for example from WO 2006/119304 A1: 2-[3'-t-butyl-5'-methacryloyloxy-(2'-(2"-ethylhexyloxy) carbonyl) ethyl-2'-hydroxyphenyl]-5-chloro-2H-benzotriazole, 5-trifluoromethyl-2-[2'-hydroxy-3'-α-cumyl-5'-(methacryloyloxy-α-cumyl) phenyl] benzotriazole, 2-[3'-t-butyl-(5'-methacryloyloxy-t-butyl)-2'-hydroxyphenyl] benzotriazole, 2-(5'-methacryloyloxy-t-butylphenyl) benzotriazole, 2-(2'-hydroxy-5'-t-methacryloyloxyoctyl phenyl) benzotriazole, 2-(3'-dodecyl-2'-hydroxy-5'-methacryloyloxy methylphenyl) benzotriazole, 2-(5'-methacryloyloxymethyl-2'-hydroxyphenyl) benzotriazole, 5-chloro-2-(3'-t-butyl-2'-hydroxy-5'-methacryloyloxymethylphenyl) benzotriazole, 2-(3'-sec-butyl-5'-methacryloyloxy-t-butyl-2'-hydroxyphenyl) benzotriazole, 2-(3'-t-amyl-5'-methacryloyloxy-t-amyl-2'-hydroxyphenyl) benzotriazole, 5-trifluoromethyl-2-(2'-hydroxy-3'-t-butyl-5"-(methacryloyloxy-t-butyl) phenyl] benzotriazole, 2-(3'-α-cumyl-5'-methacryloyloxy-2'-hydroxyphenyl) benzotriazole, 5-fluoro-2-[2'-hydroxy-3'-α-cumyl-5"-(methacryloyloxy-α-cumyl) phenyl] benzotriazole, 2-[2'-hydroxy-3'-t-octyl-5'-methacryloyloxy-α-cumylphenyl] benzotriazole, 2- (3'-t-butyl-2'-hydroxy-5'-methacryloyloxy (2"-octyloxycarbonyl) ethylphenyl) benzotriazole, 2-(3'-t-butyl-2'-hydroxy-5'-methacryloyloxy (2"-octyloxycarbonyl) ethylphenyl)-5-chloro-benzotriazole, 2-(3'-t-butyl-2-hydroxy-5'-methacryloyloxy-(2"-methoxycarbonyl) ethylphenyl)-5-chloro-benzotriazole, 2-[3'-t-butyl-2'-hydroxy-5'-(2"-methoxycarbonylethyl) phenyl] benzotriazole, 5-chloro-2-[2'-hydroxy-3'-α-cumyl-5'-(methacryloyloxy-t-octyl) phenyl] benzotriazole, 2-(2'-hydroxy-4'-methacryloyloxyoctyloxyphenyl) benzotriazole, 2-[3'-t-butyl-2'-hydroxy-5'-methacryloyloxy- (2"-isooctyloxycarbonylethyl) phenyl] benzotriazole, 5-chloro-2-(3'-t-butyl-5'-methacryloyloxy-t-butyl-2'-hydroxyphenyl) benzotriazole, 5-trifluoromethyl-2-[2'-hydroxy-3'-α-cumyl-5'-(methacryloyloxy-t-butyl) phenyl] benzotriazole, 5-phenylsulfonyl-2-[2'-hydroxy-3'-t-butyl-5'-(methacryloyloxy-t-butyl) phenyl] benzotriazole, 5-chloro-2-(2'-hydroxy-3'-a-cumyl-5'-(methacryloyloxy-α-cumyl) phenyl] benzotriazole, 5-trifluoromethyl-2-[2'-hydroxy-3'-t-octyl-5'-(methacryloyloxy-t-octyl) phenyl] benzotriazole, 2-[3'-t-butyl-2'-hydroxy-5'-methacryloyloxy-(2"-isooctyloxycarbonylethyl) phenyl] -5-chloro-benzotriazole, 5-trifluoromethyl-2-[2'-hydroxy-3'-α-cumyl-5'-(methacryloyloxy-t-octyl) phenyl] benzotriazole, 5-trifluoromethyl-2-[2'-hydroxy-5'-(methacryloyloxy-t-octyl) phenyl] benzotriazole, 5-butylsulfonyl-2-[2'-hydroxy-3'-t-butyl-5'-(methacryloyloxy-t-butyl) phenyl] benzotriazole, and 2-[2'-hydroxy-3'-α-cumyl-5'-(methacryloyloxy-t-octyl) phenyl] benzotriazole. Alternatively, those benzotriazoles just mentioned can be used in which the methacryloyloxy group has been replaced by other polymerizable groups, such as by acrylamido, methacrylamido, acryloyloxy, allyl and vinyl groups.

Particularly preferred, photoinitiators of the substance class of 2-hydroxyphenyl-s-triazine are used.

Pigments:

Usually, pigments are used as coloring components for colored coatings. In principle, the pigments suitable for use in the coating compositions according to the invention are not limited and can be selected freely from a variety of existing pigments. However, those pigments are preferably used which have a high light fastness and a shade, which is highly reproducible.

These examples of organic and inorganic pigments given in the following can be used in the coating compositions or inks of the invention; however, this listing does not represent a limitation whatsoever. In the invention, suitable pigments can be organic oder inorganic. Suitable inorganic pigments include, for example, titanium dioxide and carbon black, while suitable organic pigments include for example the classes of phthalocyanines, anthraquinones, perylenes, carbazoles, monoazo and bisazobenzimidazolones, isoindolinones, monoazonaphtholes, quinacridones, diazopyranthrones, pyrazolones, and pyranthrones.

Pigments are described by the color index. Usable in the coating compositions of the invention are for example:

Red and magenta pigments: Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36, or similar;

Blue and cyan pigments: Blue 1, 15, 15:1, 15:2, 15:3, 15:4, 15:6, 16, 17-1, 22, 27, 28, 29, 36, or 60, or similar;

Green pigments: Green 7, 26, 36, or 50, or similar;

Yellow pigments: Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193, or similar;

Black pigments: Black 7, 28, or 26, or similar, and

White pigments: 6, 18, or 21, or similar.

The pigments can be selected depending on the particular application. Preferred pigments are those which have a light fastness of 7 or higher on the Blue Wool Scale.

The pigments are usually introduced into the formulations of the coating compositions of the invention by means of grinding them in selected reactive monomers and/or oligomers. Adding dispersants and wetting aids can often enhance the efficiency of the grinding and stabilize those pigments deagglomerated by the grinding process. Suitable additives of this kind are for example available under the trade names SOLSPERSE® (The Lubrizol Corporation), EFKA® (BASF), TEGO (Evonik), and BYK (Byk Chemie). The addable amount of dispersant is determined by the type and amount of the chosen pigment and is for organic pigments approximately 20 to 100% by weight, for inorganic pigments approximately 5 to 80% by weight, each based on the amount of the pigment.

Any commercially available dispersing machine such as ball or bead mills, a Henschel mixer, a colloid mill, an ultrasonic homogenizer or a paint shaker can be used to disperse or to grind the chosen pigment in the fluid matrix; for a solid/molten matrix, an extruder may be used.

In addition, other components can be used in the coating compositions of the invention. Alternatively, the pigments can be dispersed in a solvent, for example. It is, however, preferable not to use a solvent.

In principle, one or more different pigments can be used in the coating compositions of the invention.

To ensure high color strength, good sedimentation stability, Newtonian viscosity behavior, good filterability, and good polymerization properties in the embodiments of the coating compositions of the invention as an ink, the particle diameter of the pigments should be from 0.005 to 0.5 μm. The average diameter is preferably between 0.01 and 0.35 μm, and more preferably between 0.015 and 0.3 μm.

The preferred content of pigments in the inks of the invention is a function of the desired properties and is between 0.5 and 10% by weight, preferably between 1 and 8% by weight, based on the total weight of the respective formulation.

If the composition of the ink according to the invention corresponds to a white ink, a white pigment such as titanium oxide is used, preferably in a proportion of 5 to 30% by weight and more preferably in a proportion of 10 to 25% by weight, based on the total weight of the respective formulation.

The coating composition of the invention, in particular when formed into an ink, may contain other ingredients to improve for example thermal stability, printability or other physical and chemical properties. Some additional additives are described below.

Additional additives

The disclosed composition of the present invention may include other components, in addition to the above-mentioned components. Examples include polymerization inhibitors and solvents.

Polymerization inhibitors are optionally added to enhance the storage stability of the coating compositions of the invention. If the coating composition of the invention is to be used as an inkjet ink, it is heated prior to use preferably to 40-80° C. to lower its viscosity. In this case, added polymerization inhibitors can prevent/reduce an undesired pre-polymerization and thus prevent clogging of the print heads. The concentration range used of these inhibitors can be very broad, and is typically between 150 to 25000 ppm, based on the total ink composition. Examples of such compounds are TEMPO, TEMPOL, cupferron A1, quinones (hydroquinone, 1,4-benzoquinone, 1,2-benzoquinone) and p-methoxyphenol.

Usually, no pure solvents (i.e. no components which cannot polymerize) are used in radiation curable coatings in order to not impair the crosslinking/curing. However, solvents may be added to the coating composition of the invention which do not adversely affect crosslinking. These solvents may be organic solvents or water. Specifically, organic solvents may be added to improve the adhesion of the coating to the substrate to be printed (e.g. paper). Feasable concentration ranges for the solvent are 0.1 to 5% by weight, based on the total coating composition. Examples of possible organic solvents are propylene carbonate, dimethyl succinate, dimethyl glutarate, dimethyl adipate, or mixtures thereof.

Of course, the coating composition according to the invention may include still other components well-known to the state of the art. By way of example, the addition of flow additives, surface active components, matting agents or the use of resins/waxes (e.g. polyester resins, vinyl resins, acrylic resins, polyurethane resins, teflon resins) may be mentioned here, in order to adjust the physical properties such as viscosity and stability to UV radiation.

Another possible additive is the so-called tackifier (adhesion promotor to the substrate to be coated). These must not interfere with polymerization and may for example be polyolefins or PETs. Some examples of suitable high molecular weight compounds are given in JP 200149200; moreover, even low molecular weight resins having polymerizable unsaturated compounds are suitable.

Ink characteristics:

The coating composition according to the invention is not limited to specific physical properties. Thus, the coating can be carried out in the form of a powder coating or a liquid coating, as already mentioned. A preferred embodiment is in the form of an ink, particularly an inkjet ink. The viscosity of the inks of the invention at the processing temperature—ususally approximately 15 to 60° C.—is preferably in the range of 2 to 20 mPa·s, more preferably in the range of 6 to 12 mPa·s. Higher viscosities might contribute to the ink's inability to penetrate into the substrates to be coated, in particular into porous substrates. In addition, the proportion of cured monomers and the odor can be reduced. Furthermore, a so-called bleeding of the printed ink drops is suppressed, resulting in improved image quality.

The surface tension of an ink composition according of the invention is preferably within a range of 20 to 35 mN/m, preferably from 22 to 28 mN/m, in each case at room temperature. If the substrate to be coated is uncoated paper, coated paper, polyolefin or PET, then the surface tension is usually 20 mN/m or more, in order to prevent bleeding and penetration, or 30 mN/m or less for an appropriate wettability (each measured at room temperature).

Preparation of An Ink as a Preferred Coating Agent

The formulations according to the invention are prepared by combining the relevant components by mixing, stirring, milling, extruding and other methods that are suitable to produce homogenous compositions.

Curing of a Coating According to the Invention

The coating of the invention is preferably cured with a light source having an emission peak of >350 nm by polymerization. This light source may for example be a HG/UV lamp with appropriate filters which has its emission peak at >350 nm, preferably at >390 nm. The preferred light source is a UV/LED lamp (light-emitting diode) or UV/LD lamp (laser diode) which has its emission peak at >360 nm, preferably >390 nm.

LEDs are of small sizes, long lifetime, high efficiency and of attractive cost. These systems are commercially available. Also, a combination of light sources having different emission spectra is possible. To cure the coating compositions according to the invention, LEDs having a maximum light intensity on the substrate to be coated of 10 to 2000 mW/cm$^2$, particularly preferred of 50 to 900 mW/cm$^2$, are preferably employed. Curing is normally effected by irradiating for a period from 0.01 to 150 seconds, preferably from 0.1 to 100 seconds. Possible—but not exclusive—conditions and methods for curing a coating composition according to the invention in the form of an ink are set forth in JP 60132767. Hereby, the radiation source is in many cases mounted on the print head element together with the inkjet element. In this case, radiation is emitted after a predefined period (e.g. 0.01 to 0.5 seconds) following the application of the coating composition. In order to reduce the so-called bleeding, this period is usually selected to be short. By this, penetration into a porous medium may be minimized, for example, which, however, is important as the emitted radiation can only partially penetrate into a porous body. This reduces the amount of unreacted monomer, as well as the odor.

OVERVIEW OF THE FIGURES

FIG. 1: Illustration of the emission spectrum of a mercury-based UV lamp and the absorption range of Tinuvin 400.

Figure 2:
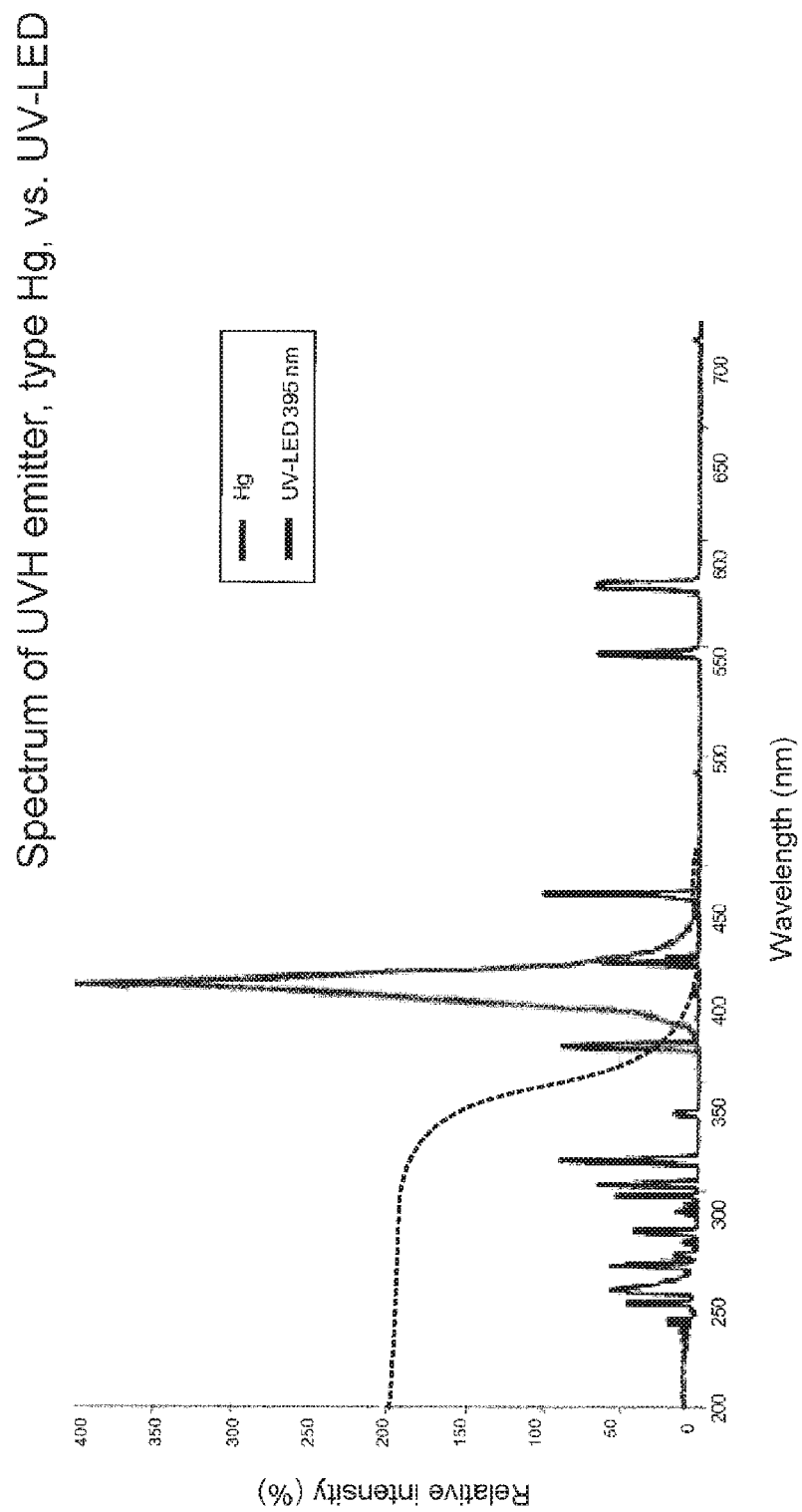

FIG. 2: Comparison of the emission spectra of a mercury UV lamp and a UV/LED lamp and illustration of the absorption range of Tinuvin 400.

FIG. 3: Exemplary absorption curves of possible UV absorbers (the graphics was extracted from the brochure "Coatings that stay looking good—BASF performance additives" of BASF SE).

FIG. 1: In FIG. 1, an emission sprectrum of a mercury UV lamp is shown (black solid line). As can be seen, a plurality of emission peaks appear with this light source, most of which peaks are below 400 nm. The black dashed line shows the absorption spectrum of a possible UV absorber. As can be seen, the absorption spectrum largely superimposes the radiation emitted by the mercury lamp, and thus, UV radiation cannot optimally be made available for curing the coating. This results in an inadequately cured layer, or alternatively, in an insufficient concentration of the UV absorber in the coating in cases of self-consuming absorbers at relatively long exposition and curing times which results in a poor outdoor durability.

FIG. 2: In FIG. 2, the emission range of a standard mercury UV lamp, a UV/LED lamp and the absorption range of a possible UV absorber are compared. In a preferred embodiment of the invention, UV absorbers and UV/LED lamps are used which result in no or only a negligible overlap of the absorption or emission spectrum. As shown in FIG. 2, the emitted power of a UV/LED is about 4 times higher than that of a mercury radiator. Furthermore, the illustrated UV absorber absorbs only slightly in the wavelength range around 395 nm, which manifests itself in a high transparency of the UV absorber for the UV radiation provided by the UV/LED. In summary, this yields a good curing of the coating and, at the same time, a still sufficient concentration of UV absorbers to provide an adequately high UV protection for an outdoor stability.

FIG. 3 shows exemplary absorption curves of possible UV absorbers; the graphics was extracted from the brochure "Coatings that stay looking good—BASF performance additives" of BASF SE.

Below, exemplary embodiments of the disclosed invention are set forth. These examples are merely illustrative, without limiting the scope of the invention to these examples.

Examples of Outdoor Resistant Inks

| Component | Chemical Description | Manufacturer |
| --- | --- | --- |
| SR9003* | propoxylated (2) neopentylglycol diacrylate | Sartomer-Arkema |
| SR833S* | tricyclodecane dimethanol diacrylate | Sartomer-Arkema |
| SR339C* | 2-phenoxyethyl acrylate | Sartomer-Arkema |
| CN820* | acrylated acrylate | Sartomer-Arkema |
| SR217* | tert-butylcyclohexyl acrylate | Sartomer-Arkema |
| SR9051* | acid-based adhesion additive | Sartomer-Arkema |
| Tego Disperse 685 | high molecular weight polymer | Evonik |
| WAKO Q1301 | aluminum salt of N-nitrosophenylhydroxylamine | WAKO Chemicals |
| Irgacure TPO | 2,4,6-trimethylbenzoyl diphenylphosphine oxide | BASF |
| Speedure ITX | CAS Number 5495-84-1 (2-isomer) & 83846-86-0 | Lambson |
| Irgacure 819 | phenylbis (2,4,6-trimethylbenzoyl) phosphine oxide | BASF |
| Tinuvin 400 | 2-hydroxyphenyl-s-triazine | BASF |
| SR531* | cyclic trimethylolpropane formal acrylate | Sartomer-Arkema |
| SR506D* | isobornyl acrylate | Sartomer-Arkema |
| SR238* | 1,6-hexanediol diacrylate | Sartomer-Arkema |
| RUVA-93 | CAS No: 96478-09-0 | Otsuka Chemical Co. Ltd |

| Component | Standard formulation | Exp. 1 | Exp. 2 | Exp. 3 | Exp. 4 | Exp. 5 | Exp. 6 | Exp. 7 | Exp. 8 | Exp. 9 | Exp. 10 | Exp. 11 | Exp. 12 |
| --- | --- | --- | --- | --- | --- | --- | --- | --- | --- | --- | --- | --- | --- |
| CN152* | 1 | 1 | | | 1 | 1 | | | | | | | |
| CN386* | 3 | 3 | | | 3 | 3 | | | | | | | |
| CN704* | 2 | 2 | | | 2 | 2 | | | | | | | |
| Dow Corning 57 | 0.2 | 0.2 | 0.2 | 0.2 | 0.2 | 0.2 | 0.2 | 0.2 | 0.2 | 0.2 | 0.2 | 0.2 | 0.2 |
| SR9003* | 3.5 | 3.5 | | | 3.5 | 3.5 | | | | | | | |
| SR833S* | 1.2 | 1.5 | | | 1.2 | 1.5 | | | | | | | |
| SR339C* | 43.35 | 40.75 | | | 43.35 | 40.75 | | | | | | | |
| CN820* | 2.2 | 1 | | | 2.2 | 1 | | | | | | | |
| SR217* | 4 | 4 | | | 4 | 4 | | | | | | | |
| SR9051* | 0.7 | 0.7 | 0.8 | 0.4 | 0.7 | 0.7 | 0.4 | 0.4 | 0.4 | 0.4 | 0.4 | 0.4 | 0.4 |
| Tego Disperse 685 | 0.2 | 0.2 | | | 0.2 | 0.2 | | | | | | | |
| N-vinyl-caprolactam | 18 | 18 | | | 18 | 18 | | | | | | | |
| WAKO Q1301 | 0.05 | 0.05 | 0.05 | 0.05 | 0.05 | 0.05 | 0.05 | 0.05 | 0.05 | 0.05 | 0.05 | 0.05 | 0.05 |
| Irgacure TPO | 0.5 | 0.5 | | 2 | 0.5 | 0.5 | 2 | 2 | 2 | 2 | 2 | 2 | 2 |
| Speedure ITX | 2.5 | 2.5 | 2.5 | 2.5 | 2.5 | 2.5 | 2.5 | 2.5 | 2.5 | 2.5 | 2.5 | 2.5 | 2.5 |
| Irgacure 819 | 4 | 4 | 4 | 2 | 4 | 4 | 2 | 2 | 2 | 2 | 2 | 2 | 2 |
| Millbase Yellow 1 | 10.5 | 9 | 9 | | 10.5 | 9 | | | | | | | |
| Millbase Yellow 2 | | | | 9 | | | 9 | 9 | 9 | 9 | 9 | 9 | 9 |
| Tinuvin 400 | | 5 | 5 | 5 | | 5 | 10 | 15 | 20 | | | | |
| SR531* | | | 60.35 | 58.75 | | | 53.75 | 48.75 | 43.75 | 43.75 | 38.75 | 43.75 | 38.75 |
| SR506* | | | 12 | 12 | | | 12 | 12 | 12 | 12 | 12 | 12 | 12 |
| SR238* | | | 3 | 5 | | | 5 | 5 | 5 | 5 | 5 | 5 | 5 |
| RUVA-93 | | | | | | | | | | 20 | 25 | | |
| oMTP | | | | | | | | | | | | 20 | 25 |
| Curing | UV-LED | UV/LED | UV/LED | UV/LED | Hg lamp | Hg lamp | UV/LED | UV/LED | UV/LED | UV/LED | UV/LED | UV/LED | UV/LED |

Millbase Yellow 1: 21% Cromophtal Yellow D108, 7% Tego Disperse 685, 72% SR531*
Millbase Yellow 2: SPECTRA RAY IJ YELLOW 150 UV Dispersion
*Sartomer product code

| Component | Chemical Description | Manufacturer |
| --- | --- | --- |
| CN152* | aliphatic epoxy acrylate | Sartomer-Arkema |
| CN386* | acrylated amine synergist | Sartomer-Arkema |
| CN704* | polyester acrylate | Sartomer-Arkema |
| Dow Corning 57 | Silicone | Dow Chemical |
| oMTP | o-methylallyl Tinuvin P | Polyscience |
| Cromophtal Yellow D108 | yellow pigment | BASF |

-continued

| Component | Chemical Description | Manufacturer |
|---|---|---|
| SPECTRA RAY IJ YELLOW 150 UV Dispersion | pigment dispersion | SunChemical |

| | ΔE QUV-A tests | | ΔE QUV-B tests | | |
|---|---|---|---|---|---|
| Ink | 1000 h | 2000 h | 300 h | 600 h | 900 h |
| Standard formulation | 3.02 | 6.89 | 4.14 | 6.57 | 8.17 |
| Example 1 | 1.54 | 3.89 | 2.65 | 3.89 | 5.65 |
| Example 2 | 1.44 | 3.54 | 2.35 | 3.54 | 5.05 |
| Example 3 | 1.12 | 2.92 | 0.73 | 2.76 | 3.52 |
| Example 4 | 3.05 | 7.05 | 4.20 | 6.75 | 8.05 |
| Example 5 | 2.75 | 6.38 | 3.76 | 5.95 | 7.67 |
| Example 6 | 1.02 | 2.52 | 0.52 | 2.12 | 2.85 |
| Example 7 | 0.56 | 1.12 | 0.45 | 1.12 | 1.96 |
| Example 8 | 0.48 | 1.09 | 0.48 | 0.93 | 2.05 |
| Example 9 | 0.32 | 0.81 | 0.35 | 0.64 | 1.56 |
| Example 10 | 0.31 | 0.79 | 0.41 | 0.55 | 1.20 |
| Example 11 | 0.42 | 0.95 | 0.25 | 0.49 | 1.32 |
| Example 12 | 0.31 | 0.80 | 0.30 | 0.55 | 1.03 |

The standard formulation mentioned in the above table in the first place is not an object of the present invention, as it contains no UV absorber. Below, it is explained with reference to the individual examples which changes were made compared to the standard formulation. Example 1: UV absorber was added,
Example 2: acrylate matrix was adapted,
Example 3: pigment was exchanged,
Example 4: standard formulation was cured with a Hg lamp,
Example 5: formulation of example 1 was cured with a Hg lamp,
Example 6: 10% UV absorber,
Example 7: 15% UV absorber,
Example 8: 20% UV absorber,
Example 9: 20% radically polymerizable UV absorber,
Example 10: 25% radically polymerizable UV absorber,
Example 11: 20% radically polymerizable UV absorber,
Example 12: 25% radically polymerizable UV absorber,

The invention claimed is:

1. A radiation-curable coating composition comprising pigments, at least one polymerizable, unsaturated compound in a concentration range of 15-98% by weight and 5-35% by weight of one or more organic UV absorber wherein the UV absorber(s) has/have a maximum absorption coefficient in a wavelength range of <350 nm.

2. The radiation-curable coating composition of claim 1, wherein the polymerizable, unsaturated compound is a (meth)acrylate or vinyl compound.

3. The radiation-curable coating composition of claim 1, further defined as comprising 5-20% by weight organic UV absorber(s).

4. The radiation-curable coating composition of claim 1, wherein at least one organic UV absorber is radically polymerizable.

5. The radiation-curable coating composition of claim 4, wherein the coating composition includes other components in an amount of a balance to 100% by weight.

6. The radiation-curable coating composition of claim 5, further defined as comprising at least one or more of a photoinitiator, photosensitizer, bulking agent, additive and/or other UV absorber in a total concentration range of 0-80% by weight.

7. The radiation-curable coating composition of claim 6, further defined as comprising at least one photosensitizer and/or photoinitiator with an absorption maximum in a range of less than 420 nm.

8. The radiation-curable coating composition of claim 7, wherein the at least one photosensitizer and/or photoinitiator has an absorption maximum in a range of greater than 350 nm.

9. The radiation-curable coating composition of claim 1, comprising a proportion of monofunctional polymerizable components that is at least 50% by weight of all polymerizable components of the composition.

10. The radiation-curable coating composition of claim 9, wherein the proportion of monofunctional polymerizable components is at least 75% by weight of all polymerizable components of the composition.

11. The radiation-curable coating composition of claim 1, comprising a proportion of monofunctional polymerizable components that is at most 25% by weight of all polymerizable components of the composition.

12. The radiation-curable coating composition of claim 1, further defined as an ink.

13. The radiation-curable coating composition of claim 12, further defined as inkjet ink.

14. A method for curing a coating composition comprising:
obtaining a radiation-curable coating composition of claim 1; and
curing the radiation-curable coating composition with a light source having an emission peak of >350 nm.

15. The method of claim 14, wherein the light source is a UV/LED lamp or a UV/LD lamp having an emission peak of >360 nm.

16. The method of claim 15, wherein the light source has an emission peak of >390 nm.

17. A coating produced by curing a radiation-curable coating composition of claim 1.

* * * * *